United States Patent [19]

Yee et al.

[11] Patent Number: 5,809,457
[45] Date of Patent: Sep. 15, 1998

[54] INERTIAL POINTING AND POSITIONING SYSTEM

[75] Inventors: Robert Yee, Mountain View; Fred Robbins, Santa Clara, both of Calif.

[73] Assignee: The United States of America as represented by the Administrator of the National Aeronautics and Space Administration, Washington, D.C.

[21] Appl. No.: 614,784

[22] Filed: Mar. 8, 1996

[51] Int. Cl.[6] .............................. G05B 19/18; H01Q 3/00
[52] U.S. Cl. ........................ 701/220; 701/221; 701/213
[58] Field of Search ................................. 701/220, 221, 701/213, 214; 342/357, 457, 359; 250/203.1

[56] References Cited

U.S. PATENT DOCUMENTS

| | | | |
|---|---|---|---|
| 4,085,440 | 4/1978 | Hose | 364/454 |
| 4,758,959 | 7/1988 | Thoone et al. | 364/454 |
| 4,764,881 | 8/1988 | Gagnon | 364/559 |
| 5,014,205 | 5/1991 | Sindlinger et al. | 364/449 |
| 5,193,064 | 3/1993 | Maki | 364/454 |
| 5,216,611 | 6/1993 | McElreath | 364/454 |
| 5,260,709 | 11/1993 | Nowakowski | 342/62 |
| 5,365,447 | 11/1994 | Dennis | 364/449 |
| 5,390,125 | 2/1995 | Sennott et al. | 364/449 |
| 5,394,333 | 2/1995 | Kao | 364/450 |
| 5,396,326 | 3/1995 | Knobbe et al. | 356/255 |
| 5,463,402 | 10/1995 | Walrath et al. | 342/359 |
| 5,517,205 | 5/1996 | Van Heyningen et al. | 343/765 |
| 5,587,714 | 12/1996 | Chu et al. | 342/354 |
| 5,678,171 | 10/1997 | Toyama et al. | 455/3.2 |

OTHER PUBLICATIONS

N.P. Carleton et al.; *A Precision Control System For a Large Astronomical Telescope*; IEEE; 1973; pp. 882–883.

H. Dougherty et al.; *Space Telescope Pointing Control System*; Journal of Guidance, Control and Dynamics; Jul.–Aug. 1982; vol. 5, No. 4; pp. 403–409.

*Primary Examiner*—Michael Zanelli
*Attorney, Agent, or Firm*—Kathleen Dal Bon; Harry Lupuloff; John G. Mannix

[57] ABSTRACT

An inertial pointing and control system and method for pointing to a designated target with known coordinates from a platform, to provide accurate position, steering, and command information. The system continuously receives GPS signals and corrects Inertial Navigation System (INS) dead reckoning or drift errors. An INS is mounted directly on a pointing instrument rather than in a remote location on the platform for monitoring the terrestrial position and instrument attitude, and for pointing the instrument at designated celestial targets or ground based landmarks. As a result, the pointing instrument and the INS move independently in inertial space from the platform since the INS is decoupled from the platform. Another important characteristic of the present system is that selected INS measurements are combined with predefined coordinate transformation equations and control logic algorithms under computer control in order to generate inertial pointing commands to the pointing instrument. More specifically, the computer calculates the desired instrument angles (Phi, Theta, Psi), which are then compared to the Euler angles measured by the instrument-mounted INS, and forms the pointing command error angles as a result of the compared difference.

22 Claims, 7 Drawing Sheets

INERTIAL POINTING AND POSITIONING SYSTEM

ORIGIN OF THE INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

The present invention is generally directed to inertial pointing systems. More specifically, this invention relates to an inertial pointing and control system that enables accurate pointing to a designated stellar target, such as a star or a satellite, from a moving three-dimensional platform, such as an airplane, ground vehicle, or a ship, in order to provide accurate position, steering, and command information.

2. Description of the Prior Art

In recent years aircraft navigation and airspace control have been vastly improved by the integration of the Global Positioning System (GPS) into various navigation systems such as the Inertial (dead reckoning) Navigation System (INS), and the Microwave Landing System (MLS). Exemplary hybrid arrangements are illustrated in the following patents, all of which are incorporated herein by reference.

U.S. Pat. No. 5,193,064 to Maki discloses a method for integrating the GPS and the INS without the use of accelerometers to provide a velocity steering signal for use in the guidance of a space craft.

U.S. Pat. No. 5,216,611 to McElreath describes a method that integrates data from long range aids such as the GPS and INS and range aids such as MLS, in order to transition an aircraft from the long range aids to the short range aids.

U.S. Pat. No. 5,394,333 to Kao teaches a hybrid vehicle navigation system that employs both GPS and dead reckoning sensors, working in parallel, to produce a sensed and a calculated position, respectively.

U.S. Pat. No. 5,390,125 to Sennott et al. relates to a vehicle positioning system which purportedly provides fast tracking of a terrestrial vehicle. The patented system envisions combining the conventional capabilities of an Inertial Reference Unit (IRU) and a GPS.

However, the foregoing and other conventional systems are mainly limited either to navigating terrestrial vehicles or aircraft with the INS strapped to a selected platform airframe. Two-dimensional terrestrial navigation systems do not address nor resolve the problems associated with three-dimensional navigation, and are therefore not readily useable for that purpose.

More specifically, as a result of strapping the INS to the airframe in a conventional aircraft navigation system, pointing to a designated stellar target, such as a star or a satellite, requires highly accurate transformation and computation of the proper attitude of the pointing instrument, such as a telescope or an antenna relative to the platform. The computation algorithms are not generally based on transformation equations derived from GPS time and position, precise INS attitude, and celestial geometry. The telescope position encoder with a conventional airframe-strapped INS is subject to INS attitude uncertainties and encoder errors that accrue from bending the platform and the telescope suspension system. These errors translate into telescope pointing inaccuracies. Moreover, accurate position encoders are complex, costly and require frequent calibration. As a result, conventional three-dimensional pointing systems which are highly accurate, are also prohibitively expensive and can only be used in limited and specialized commercial applications.

Therefore, there is still a great and unsatisfied need for a practical realization of a new inertial pointing and control system that enables accurate designation of a celestial or terrestrial target from a moving two or three-dimensional platform, in order to provide the desired acquisition for target tracking.

SUMMARY OF THE INVENTION

The present invention provides a unique system that enables accurate pointing to designated stellar targets from a moving two or three-dimensional platform, in order to provide accurate telescope or antenna attitude command or platform steering information. The system minimizes instrument attitude errors by virtue of the direct mounting of the INS on a selected pointing instrument, and is therefore readily affordable for use in various commercial applications. As used herein the pointing instrument may include an antenna, a sensor, a laser, a canon, a missile launcher, or other devices.

In one embodiment, the new system performs accurate GPS-aided dead reckoning pointing of an instrument to a preselected target after the real-time position of the platform and target have been determined. It also achieves greater pointing accuracy than existing methods by eliminating numerous local coordinate transformations, utilizing GPS position updates to an INS, low-drift laser gyroscopes, and accurate GPS time source, while requiring fewer components than previous methods, hence simplifying the design and affording greater reliability. In addition, the INS gyroscopes can be incorporated into the gyroscope-stabilized telescope or antenna control loop, further reducing the number of costly components to stabilize a pointing instrument, such as a telescope or antenna, and to promote tracking with the pointing instrument.

This system and method of operation permit accurate instrument pointing and open-loop tracking on stellar targets without visual or optical feedback, while generating steering commands to the platform on which the instrument is deployed. The system further causes the stellar targets to be automatically and accurately captured within the field of view of the pointing instrument for acquisition and pseudo-tracking or open loop tracking by continuous pointing commands.

Another distinguishing feature of the new system is that pointing is achieved without requiring a high accuracy position encoder to obtain instrument position relative to the platform. Furthermore, if a position encoder were needed for platform steering purposes, such an encoder is not required to be highly accurate or expensive, which is an important feature of the direct instrument-mounted INS.

Briefly, the foregoing and other previously unattainable features and advantages of the present invention are realized by a unique inertial pointing and control system that continuously receives GPS signals and corrects the Inertial Navigation System (INS) dead reckoning drift errors. The INS monitors the terrestrial position and instrument attitude and points (or repoints at selected intervals, thus open loop tracking) an instrument at designated stellar targets.

An important aspect of the present invention is that the INS is mounted directly on the pointing instrument rather than in a remote location on the platform. As a result, the pointing instrument and the INS move independently in inertial space from the platform since the INS is decoupled from the platform. This also enables target reselection for the opportunity to perform multiple acquisitions for tracking. Additionally, the INS offers a solution to the following six degrees of freedom: three degrees of translation (X,Y,Z) and three degrees of rotation (Phi, Theta, Psi), which, at a minimum, promotes inertial stabilization of the pointing instrument.

Another important characteristic of the present system is that the INS measurements are combined with selected coordinate transformation equations and control logic algorithms under computer control in order to generate inertial pointing commands to the pointing instrument. More specifically, the computer calculates the desired instrument angles (Phi, Theta, Psi), which are then compared to the Euler angles Phi, Theta, Psi measured by the instrument-mounted INS and pointing error commands are then generated from such comparison, in order to subsequently form the pointing command signals to the pointing instrument.

The new system may be used in a wide variety of commercial applications by providing a more general solution in three-dimensional or two-dimensional space by direct navigation of a moving airborne, shipborne, a ground based or ground borne platform, and vehicle navigation, while commanding a telescope or an antenna at selected targets. One application of the present system includes pointing a sensor such as a satellite antenna fitted on a moving platform, such as a cruise ship or aircraft, wherein the sensor is accurately and inexpensively locked on a designated satellite in order to access television or cable broadcasting communications. In another application, the new pointing system generates aircraft heading commands that are fed to the autopilot system for generating a flight path to point an instrument array at a designated terrestrial target.

BRIEF DESCRIPTION OF THE DRAWING

The above and other features of the present invention and the manner of attaining them will become apparent, and the invention itself will be best understood, by reference to the following description and the accompanying drawings, wherein.

Similar numerals refer to similar elements in the drawing. It should be understood that the sizes of the different components in the Figures are not in exact proportion, and are shown for visual clarity and for the purpose of explanation.

Figure 1:
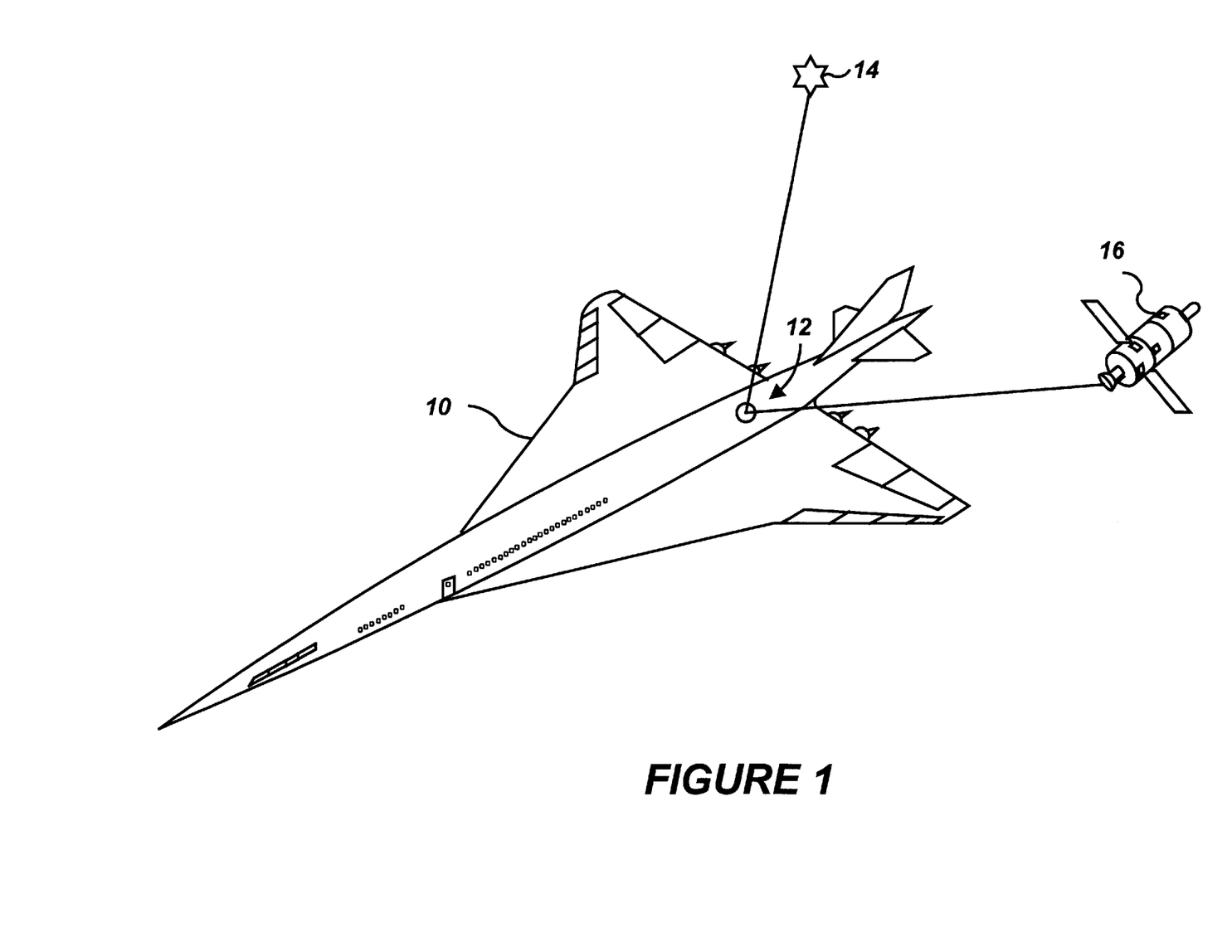
FIG. 1 is a perspective view of a airplane equipped with an inertial pointing and positioning system according to the present invention.

FIG. 1 shows an exemplary three-dimensional moving platform 10, such as an airplane, equipped with the inertial pointing and positioning system 12 according to the present invention. The system 12 is capable of accurate pointing and open-loop tracking a plurality of celestial targets with known astronomical coordinates, such as a star 14 and/or a satellite 16, in order to provide very accurate position, steering, and command information to the platform 10. The system 12 generates platform steering commands to acquire or obtain the target within the instrument field of view.

Figure 2:
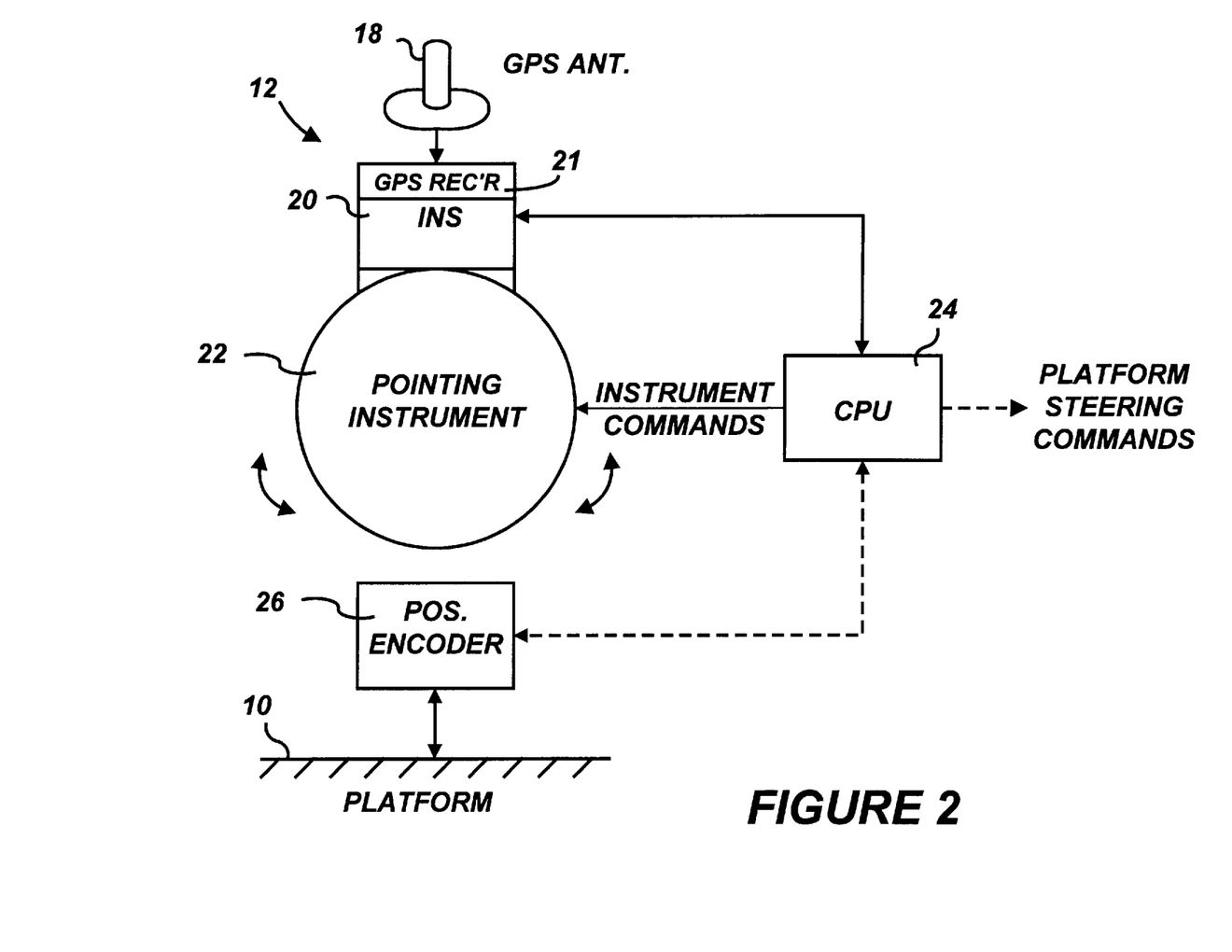
FIG. 2 is a high level block diagram illustrating the architecture/hardware of the inertial pointing and positioning system of FIG. 1.

FIG. 2 provides a high level block diagram of the system 12 of FIG. 1. The system 12 generally includes a GPS antenna 18 that continuously receives signals from the GPS satellites and feeds the GPS signals to a GPS receiver 21 in an Inertial Navigation System (INS) 20. The GPS signals correct dead reckoning navigation errors (INS position drift errors), in order to provide accurate positioning readings. The GPS signals may not always be used by the system 12, particularly if the INS drift errors are within an acceptable tolerance range.

The INS 20 monitors the terrestrial position and geodetic attitude and points a steerable pointing instrument or sensor 22, such as a telescope or an antenna, at the celestial targets 14, 16. The INS 20 includes a triad of gyroscopes and accelerometers as the inertial measurement unit (IMU) that functions primarily as the sensor unit; a processor; corresponding electronic circuits; and an added GPS receiver that receives data from the GPS antenna 18.

An important aspect of the present invention is that the INS is mounted or strapped directly on the pointing instrument 22 rather than in a remote location on the platform 10 as in conventional methods. The pointing instrument 22, and hence the INS 20 rotates or moves in inertial space independently from the platform 10. As a result of this departure from conventional designs, the INS 20 is decoupled from the platform 10, and rather than having the pointing instrument 22 be slaved to the platform 10, the platform 10 has now become slaved to the pointing instrument 22 and the INS 20. This simplifies the transformation equations, results in less errors, and promotes accurate steering of the platform 10 for target reselection or target acquisition enhancement.

The positioning of the INS 20 directly on the pointing instrument 22 improves the accuracy, performance and cost of the present system 12 over conventional pointing systems. Since the position of the INS 20 relative to the pointing instrument 22 is known and remains fixed, the system 12 eliminates measurement inaccuracies. These inaccuracies would have been introduced by dynamic error problems that develop from a separated, remotely located pointing INS, which must rely on multiple platform and suspension coordinate transformations, transfer alignment, and platform bending and misalignment error buildup.

Furthermore, the system 12 offers an alternative to complex three-dimensional position encoders by offering a simplified inertial solution with low cost components. Since the system 12 no longer requires a position encoder to provide the accurate position of the INS 20 relative to the pointing instrument 22, it basically has a simplified overall design with a reduced number of components, thus achieving significant cost reduction.

Consequently, the system 12 has now become sufficiently affordable for use in several commercial applications. For example, the system 12 will direct an airborne, seaborne, or ground platform to enhance telescope or antenna pointing at selected targets. For added illustration, a fixed platform, for instance an observatory or a moving platform, such as an aircraft, ship, tank, or vehicle can accurately point and track an optical or electromagnetic device, such as a telescope or an antenna to a stationary or moving target without feedback from the target. Ships at sea can point and open-loop track antennae at satellites for television or direct broadcast reception. Observatories may employ the system 12 as an alternative to other telescope position encoders.

Yet another advantage realized by securing the INS 20 directly on the pointing instrument 22 is that the system 12 provides a gyroscope controlled reference for stabilization and closed-loop tracking control. In other words, the gyroscopes (not shown) within the INS may be used simultaneously as control and navigation gyroscopes, thus further reducing the number of required components, and simplifying the system design.

A computer or CPU 24 interfaces with the INS 20 and converts the GPS-corrected position, the attitude of the pointing instrument 22, the GPS Universal time data, and a series of transformation routines or equations into command angles or instructions in the navigation coordinate frame, in order to point the instrument 22 very accurately at the celestial targets 14, 16, so that these celestial targets 14, 16 are captured automatically within the field of view of the instrument 22. While reference is made herein to celestial targets, it should be understood that the system 12 may alternatively be used to point at, or toward terrestrial targets, landmarks or moving objects (i.e., an airborne threat).

In certain applications, the steering instructions from the system 12 may be used for navigating the platform 10. In such applications a position encoder 26 is used to interface with the system 12, via the CPU 24, and to provide the position coordinates of the platform 10 relative to the INS 20 or instrument 22. However, the required position encoder 26 may be far less accurate than the encoder used in conventional navigation systems, because the encoder needs only be as accurate as the platform autopilot or steering control system. In certain applications where the viewing target range is limited, an inexpensive position encoder can be utilized to orient the single axis platform 10. As a result, only one encoder along one rotational axis will be needed, as opposed to three conventional, highly accurate, and expensive encoders.

During normal operation, an operator inputs the celestial coordinates, such as the right ascension (RA) and the declination (DEC) of a first preselected celestial target, i.e., the star 14, in the CPU 24. The CPU 24 then computes the correct aircraft heading and issues the new heading command. In one particular application, where the platform 10 is an airplane, the heading command is routed to the autopilot. After the aircraft flight path is corrected to the desired heading, the CPU 24 commands the pointing instrument 22, i.e., a telescope to the proper elevation, azimuth (cross-elevation), and line of sight angles, resulting in the designated celestial target appearing in the telescope focal plane field of view for celestial object acquisition and track.

Figure 3:
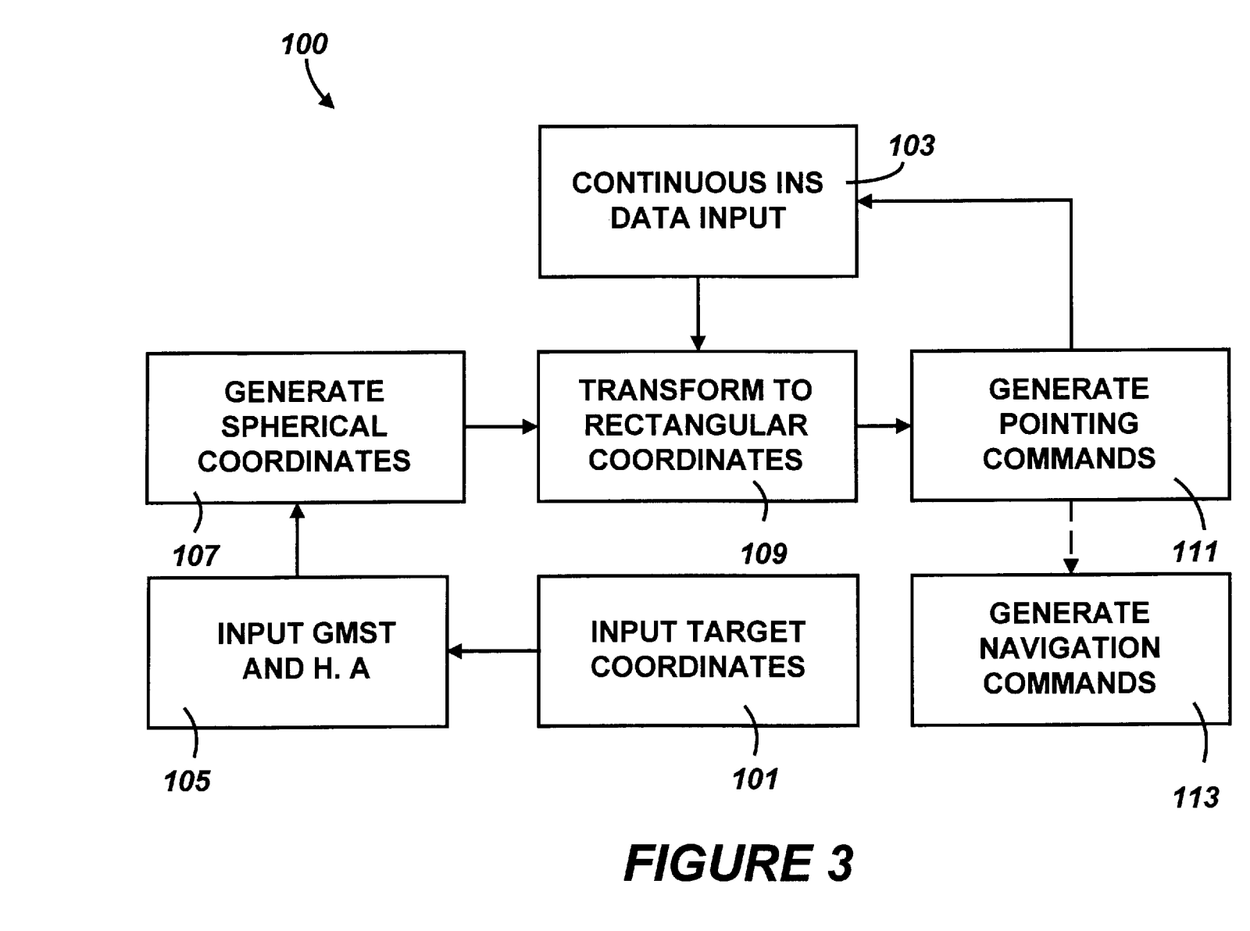
FIG. 3 is a high level flow chart illustrating the operation of the inertial pointing and positioning system of FIGS. 1 and 2.

Referring now to FIG. 3, it represents a high level flow chart illustrating a method of operation 100 of the inertial pointing and positioning system 12 in FIG. 2. A distinctive feature of the method 100 relates to the proper selection of the measurements that are calculated or derived by the INS 20 and input to the CPU 24. It is well known that the INS 20 outputs values for numerous variables, only some of which are used by the system 12 (i.e., position, time, attitude). Because it is desired to use the selected variables to effect the transformation to accurate command angles, the present method 100 apriori determines the preferred coordinate frames, and the proper transformation matrices.

FIG. 3 illustrates an exemplary process for deriving the desired command angles. The process 100 generally includes the step of inputting the known coordinates of the specified target in the CPU 24, as illustrated by step 101. Examples of these target coordinates are the spherical celestial right ascension (RA) and the declination (DEC), or latitude, longitude and height. Selected INS measurements are fed into the CPU 24 as shown in step 103. In one embodiment, the INS measurements include the INS latitude (LAT), longitude (LON), Universal Time Coordinated (UTC), and Euler angles (Theta, Psi, Phi). The Greenwich Mean Sidereal Time (GMST) is computed and entered into the CPU 24 (step 105). The CPU 24 transforms the input data to the selected celestial spherical coordinate frame (Celestial Equator C.E.), and then transforms the latter C.E. coordinate frame to corresponding Celestial Horizon (C.H.) azimuth and altitude spherical angles (step 107).

By using the terrestrial INS measurements and by selecting the celestial target angles in the spherical coordinate frame, the CPU 24 transforms the input data to the geocentric rectangular coordinate frame (step 109). Thereafter, the CPU 24 generates pointing commands and corrected pointing instructions to the instrument 22 (step 111). Optionally, the CPU 24 may use input measurements from the position encoder 26 to generate navigation commands to the platform 10 (step 113). The CPU 24 continues the foregoing routine by accepting new INS input data (steps 103, 105) and continuous updates of the pointing and navigation commands (step 111) for the selected target or a re-selected target. Circumstances may arise where it is necessary to point the instrument 22 to a different target 14, 16, whereupon, the coordinates of the new target 14, 16 are input, whether manually or automatically in the CPU 24 (step 101).

Figure 4:
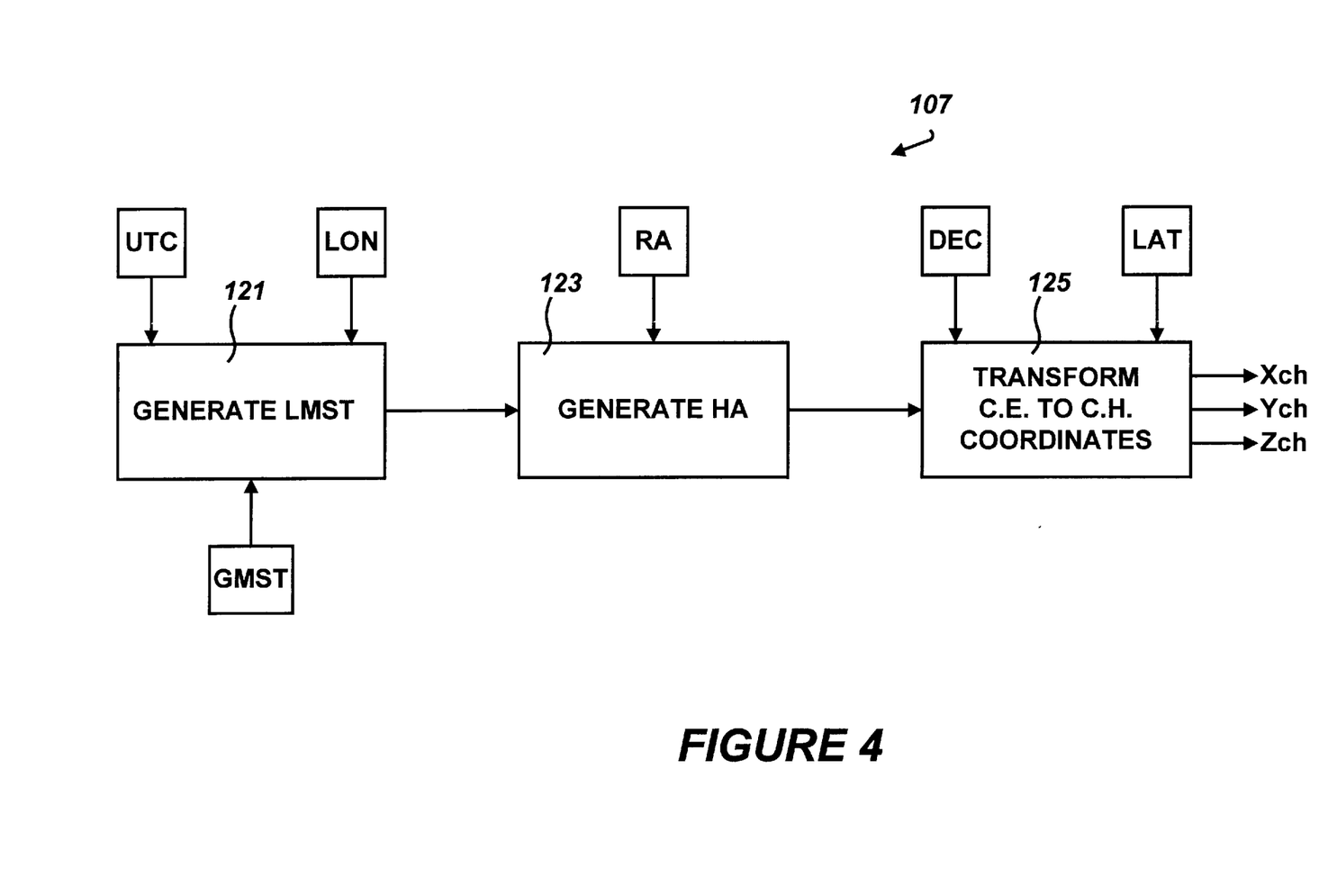
FIG. 4 is an intermediate level flow diagram illustrating the process of generating a celestial spherical coordinate frame, which process forms part of the operation of the inertial pointing and positioning system shown in FIG. 3.

FIG. 4 is an intermediate level flow diagram illustrating the process (or step 107) of transforming the input data to a spherical coordinate frame. The CPU 24 generates or computes (at step 121) the Local Mean Sidereal Time (LMST) using the GMST, as well as the LON and UTC data from the INS, according to the following equation (1):

$$LMST = GMST + LON + UTC. \tag{1}$$

The CPU 24 then calculates the Hour Angle (HA) at step 123, according to the following equation (2):

$$HA = LMST - RA. \tag{2}$$

HA forms the basic angle argument for transformation from the Celestial Equator (C.E.) coordinate frame to the Celestial Horizon (C.H.) coordinate frame (step 125). The transformation equations needed to form the instrument commands to point to the celestial target 14, 16 requires the initialization of the system 12 in the C.E. coordinate frame with the RA (at step 123) and DEC (at step 125) spherical angles. In this equation formulation, the RA and DEC are defined as the open loop set point commands that transform the two spherical angles of the celestial target 14, 16 into three rectangular pointing command angles in the coordinate frame of the instrument 22. This is achieved through four vector transformations (FIGS. 4 and 5) and the appropriate control logic that aligns the instrument 22 in the terrestrial (INS inertial) navigation tangent plane (FIG. 6).

After forming the C.E. coordinate frame rectangular vector (Xce, Yce, Zce) with the HA and DEC spherical angles, the CPU 24 transforms the C.E. coordinate frame rectangular vector into a C.H. coordinate frame vector (Xch, Ych, Zch), using the left hand direction cosine matrix with the terrestrial latitude argument. The CPU 24 then computes the C.H. azimuth and altitude spherical angles.

Figure 5:
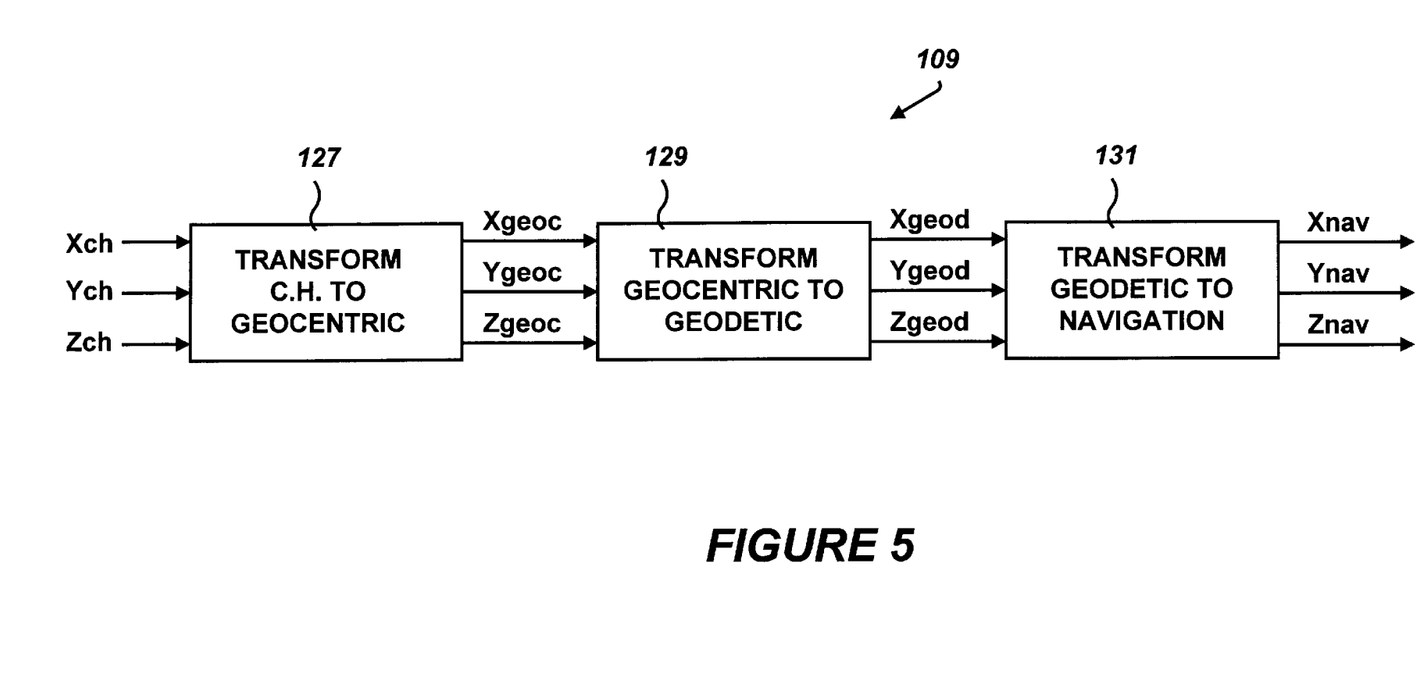
FIG. 5 is an intermediate level flow diagram illustrating the process of transforming the celestial spherical coordinate frame to a terrestrial rectangular coordinate frame, which process forms part of the operation of the inertial pointing and positioning system shown in FIG. 3.
Figure 6:
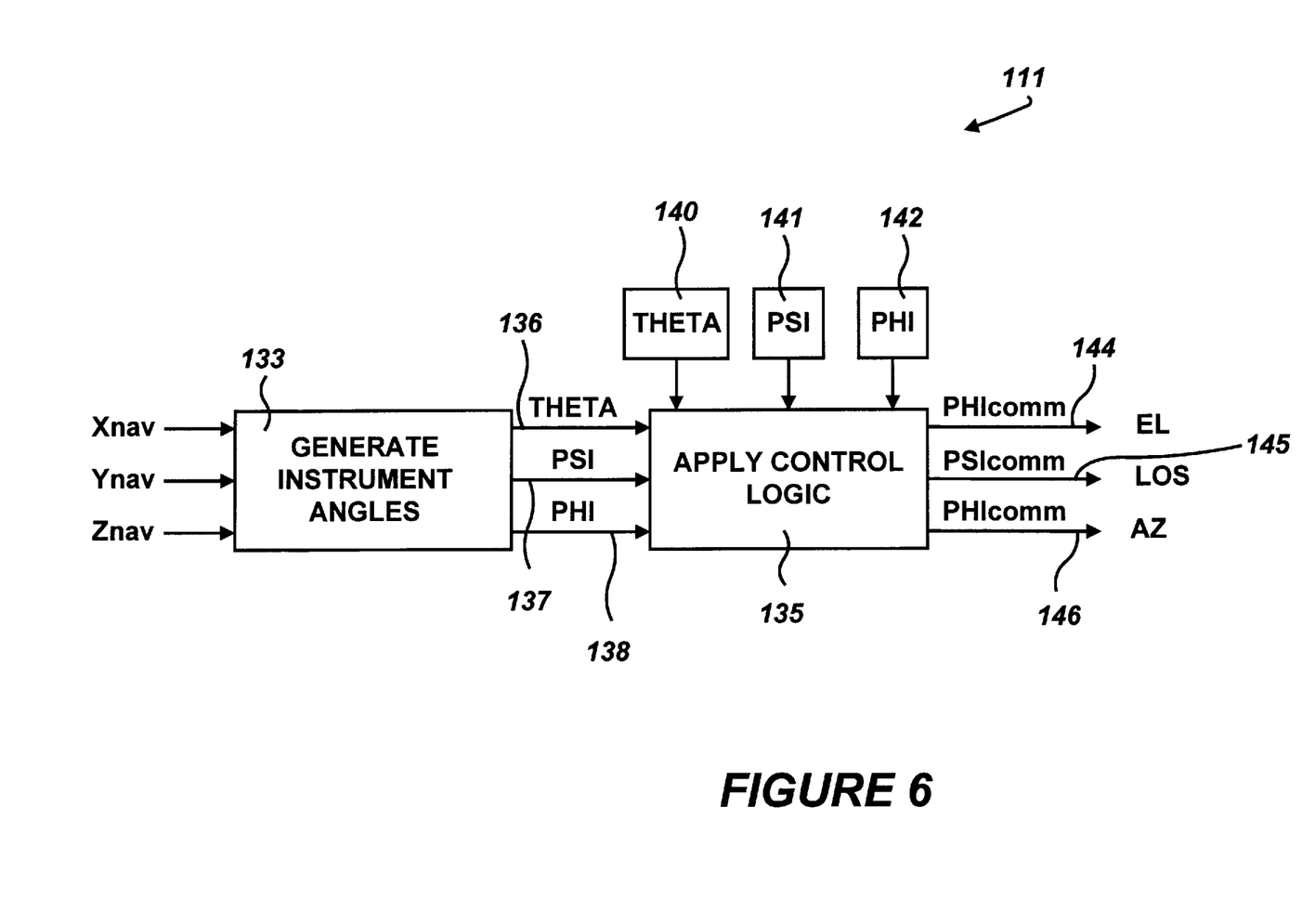
FIG. 6 is an intermediate level flow diagram illustrating the process of generating pointing commands, which process forms part of the operation of the inertial pointing and positioning system shown in FIG. 3.

Turning now to FIG. 5, it represents an intermediate level flow diagram illustrating the process (or step 109) of transforming the spherical coordinate frame to a rectangular coordinate frame. This is accomplished by transforming the C.H. horizon coordinate frame vector (Xch, Ych, Zch) into the Terrestrial Geocentric coordinate frame vector (Xgeoc, Ygeoc, Zgeoc), as shown in step 127.

The CPU 24 also computes the Geodetic latitude angle, and further transforms the Terrestrial Geocentric coordinate frame vector into the Terrestrial Geodetic coordinate frame vector (Xgeod, Ygeod, Zgeod), as shown in step 129. The CPU 24 also transforms the Terrestrial Geodetic coordinate frame vector into the Navigation coordinate frame (Xnav, Ynav, Znav) which is the INS coordinate frame (step 131). This transformation will align the instrument 22 with the C.E. coordinate frame for forming the pointing command angles.

FIG. 6 represents an intermediate level flow diagram illustrating the process (or step 111) of generating pointing commands. The CPU 24 computes the instrument pointing angles Theta, Psi, Phi 136, 137, 138 in the Navigation coordinate frame at step 133, and further applies the control logic and computes the incremental pointing command angles by comparing the INS Euler angles 140, 141, 142 with the computed pointing angles 136, 137, 138, to generate corrected pointing angle commands PHIcomm, PSIcomm, PHIcomm 144, 145, 146, respectively. It is desirable to have these corrected pointing angles commands PHIcomm, PSIcomm, PHIcomm 144, 145, 146 be as close to zero (or within a tolerance range) as possible. These corrected pointing angle commands cause the instrument 22 to point to a new pointing attitude as the platform 10 moves.

Figure 7:
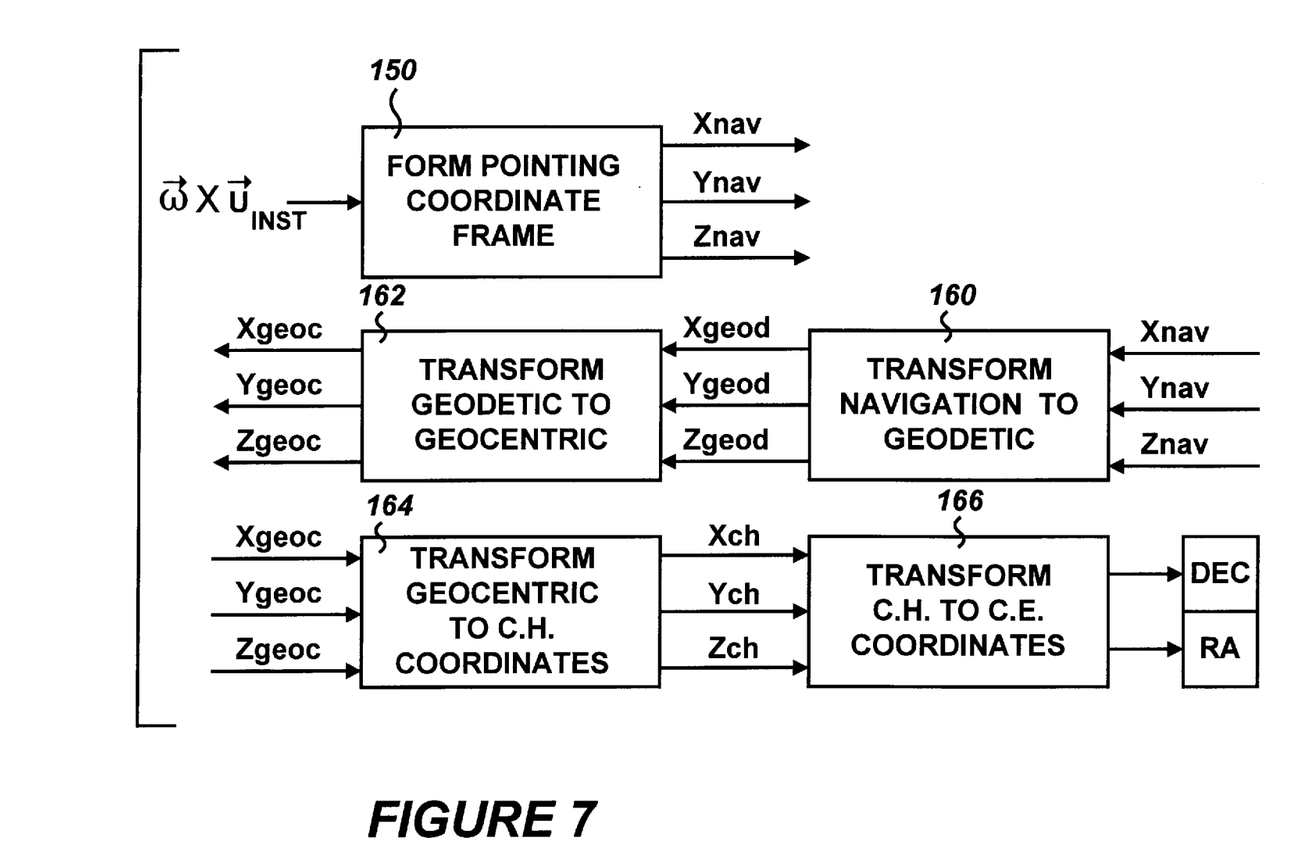
FIG. 7 is an intermediate level flow diagram illustrating the process of using the positioning system of FIG. 2 to determine the celestial spherical angles and terrestrial coordinates of a target.

Referring to FIG. 7, it represents an intermediate level flow diagram illustrating a process of using the positioning system 12 of FIG. 2, to determine the celestial spherical angles, such as RA and DEC, and the terrestrial coordinates, such as latitude (LAT), longitude (LON) and height of a predetermined target. By taking the cross product of a vectorial rate $\vec{\omega}$, which is formed of vectorial rates ($\vec{\omega}_X$, $\vec{\omega}_Y$, $\vec{\omega}_Z$) that correspond to the Euler angles (Phi, Theta, Psi) from the INS 21, and the unit vector fixed to the instrument coordinate frame ($\vec{U}_{INST}$), the CPU 24 forms a pointing coordinate frame to generate an inertial coordinate frame, such as the Navigation coordinate frame (Xnav, Ynav, Znav). In one example, the vectorial rates ($\vec{\omega}_X$, $\vec{\omega}_Y$, $\vec{\omega}_Z$) may be the derivatives of the Euler angles (Phi, Theta, Psi) respectively, with respect to time. It should however be understood that these vectorial rates ($\vec{\omega}_X$, $\vec{\omega}_Y$, $\vec{\omega}_Z$) may be derived differently.

The CPU 24 then performs the following steps, which are basically the reverse steps of those described earlier in relation to the process 100: The CPU 24 transforms the Navigation coordinate frame (Xnav, Ynav, Znav) into the Terrestrial Geodetic coordinate frame vector (Xgeod, Ygeod, Zgeod) at step 160; transforms the Terrestrial Geodetic coordinate frame vector (Xgeod, Ygeod, Zgeod) into the Terrestrial Geocentric coordinate frame vector (Xgeoc, Ygeoc, Zgeoc) at step 162; transforms the Terrestrial Geocentric coordinate frame vector (Xgeoc, Ygeoc, Zgeoc) into the C.H. coordinate frame vector (Xch, Ych, Zch) at step 164; and transforms the C.H. coordinate frame vector (Xch, Ych, Zch) into the C.E. coordinate frame rectangular vector at step 166, wherefrom the celestial spherical angles, for instance RA and DEC.

While specific embodiments of the inertial pointing and positioning system have been illustrated and described in accordance with the present invention, modifications and changes of the apparatus, parameters, use and operation will become apparent to those skilled in the art, without departing from the scope of the invention. For instance, the present inertial pointing and positioning system may be modified to point at targets in other coordinate frames.

The following source code represents an exemplary working prototype of the method of operation 100 of the inertial pointing and positioning system 12.

POINTING SYSTEM EXPERIMENTAL CODE

```
Clear all registers/values in MATLAB Version 4.2C.1
Compute Greewich Mean Sidereal Time (GMST) FOR FLIGHT.
THIS requires a value of days of year and DAYS IN YEAR.
THIS ALSO SETS definitions of KEY calculation constants
julianDate1996 =2450082.75;    Good to double-check before run
julianSinceEpoch2000 = 2451545.0; 1994 Astro. Alm., pge B16,B4
julianCentury = 36525.0;       Julian days per century (by definition)
secDay = 86400.0;              Seconds per Julian day (by definition)
INPUTS
dayofyear=40; yday=366;        placeholderS values put in for check
daysInYear=yday;               DayofYear1996 - days since Jan 1
julianDate = daysInYear+julianDate1996;
tu = (julianDate - julianSinceEpoch2000)/julianCentury;
gmst = 24110.54841 + (8640184.812866*tu) + (0.093104*tu*tu). . .
-(6.2e-6*tu*tu*tu);
gmst = gmst / secDay;
gmst = gmst - round(gmst);
gmst = (gmst+1.0) * 24.0;
GMST=gmst;
Alternately, explicitly set GMST for realtime data acquisition
GMST=11.541;
latlonerr=0;
altitude =78.7;
degtorad=pi/180;
radtodeg=180/pi;
degtohr=l/15;       Note: Earth rate set at 15 deg/hr
hrtodeg=15;
hrtorad=(15*pi)/180;
radtohr=1/hrtorad;
set initial rms constant values (normally set to zero)
mnx1=0;
mnx11=0;
cvx1=0;
cvx11=0;
mnx2=0;
mnx12=0;
cvx2=0;
cvx12=0;
mnx3=0;
mnx13=0;
cvx3=0;
cvx13=0;
LOAD IN 16 NEW ZEALAND FLIGHT CASES (8 CELESTIAL TARGETS)
(named by approximate right ascension & declination of target)
(see card accompanying data for more thorough descriptions)
Table=[
'RA10DEC59A1',
'RA10DEC59A2',
'RA13DEC29B1',
'RA13DEC29B2',
```

POINTING SYSTEM EXPERIMENTAL CODE

```
'RA13DEC29B3',
'RA16DEC21C',
'RA16DEC22D1',
'RA16DEC21D2',
'RA17DEC29E1',
'RA17DEC29E2',
'RA17DEC29E3',
'RA17DEC29E4',
'RA17DEC29E6',
'RA17DEC21F',
'RA13DEC42G',
'RA8DEC52H '];
for j=1:16,
eval(Table(j,:));
MEAN-RMS LOOP FOR NDATA POINTS FOR EACH CASE
for i=1:NDATA,
kn(i)=i;
READ IN RIGHT ASCESION & DECLINATION OF CHOSEN
TARGETS
DATA FROM MEMORY [LAT, LON, HA, PHI, THETA, PSI]
RaHr=RA;         (HRS)
RaDeg=RA*hrtodeg; (DEG)
RaRad=RA*hrtorad; (RAD)
Dec= DEC*degtorad; (RAD)
COMPUTE LAT & LONGITUDE FOR UNIT'S LOCATION (E. G.
HANGER)
Lat=LAT(i)*degtorad; RAD
LatRad=Lat;
LatDeg=Lat*radtodeg;
LonRad=LON(i)*degtorad; RAD
LonDeg=LonRad*radtodeg;
LonHr=LON(i)*degtohr; HRS
NAV FRAME-TELESCOPE FRAME EULER ANGLES FROM
LN-100G
xphiINS=0;
ythetaINS=0;
zpsiINS=0;
phi=PHI(i)*degtorad; RAD About x, AC Roll
theta=THETA(i)*degtorad; RAD About z, AC HDG
psi=PSI(i)*degtorad; RAD About y, AC PITCH
phideg=phi*radtodeg;
thetadeg=theta*radtodeg;
psideg=psi*radtodeg;
CODE TRANSFORMING FROM GEOCENTRIC TO GEODETIC
FRAME
(SEE INERTIAL NAVIGATION BY BRITTING)
FORM GEOCENTRIC TO GEODETIC TRANSFORMATION MATRIX
Note: There are two quick checks to verify if the transformation
code is probably working right. One is that the final transformation
matrix GEOCNAV should be very close to an identity matrix. If it is
off or looks stange or has an unusual sign change, then the sign of
the two sine terms in the matrix may need switching to properly,
flip the orthogonal reference frame. The second check is to see
that the ultimate correction factor is small (like 0.003 degrees).
Conversion code is deactivated here using (MATLAB comment).
h=altitude;
rEq=3963.64*5280;
rPol=3949.99*5280;
COSLAT2=cos(Lat)*cos(Lat);
SINLAT2=sin(Lat)*sin(Lat);
A2COSLAT2=rEq*rEq*COSLAT2;
B2SINLAT2=rPol*rPol*SINLAT2;
densqrt=sqrt(A2COSLAT2+B2SINLAT2);
N=(rEq*rEq)/densqrt;
numD1=(rPo1/rEq)*(rPo1/rEq);
numD2=N*numD1;
numD=numD2+h;
denD=N+h;
Dval=numD/denD;
LatC=atan(Dval*tan(Lat));
dLat=Lat-LatC;
GeoNav=[cos(dLat) 0 -sin(dLat);0 1 0;sin(dLat) 0 cos(dLat)];
IGeoNav=inv(GeoNav);
COMPUTE UNIVERSAL TIME (COORDINATIZED)
utc=clock';
UTC=12+8+utc(4,1)+utc(5,1)/60+utc(6,1)/3600;    HOURS
if UTC>=24,UTC=UTC-24;,end
UTC=4.511;
COMPUTE/READ GREENWICH MEAN SIDEREAL TIME
(from Almanac)
AND COMPUTE LMST (LOCAL MEAN SIDEREAL TIME)
Lmst=(GMST+UTC*1.0027379093);        HRS
if Lmst>=24.0,Lmst=Lmst-24.0,end
ADD LONGITUDE SIGN TAKEN FROM ABOVE (EAST +, WEST -)
Lmst=Lmst+LonHr;
if Lmst<=1,Lmst=Lmst+24;,end
Lmst=8.4178;
COMPUTE LOCAL HOUR ANGLE TO VERNAL EQUINOX
(I.E. FIRST POINT OF ARIES)
HA=(Lmst-RaHr)*hrtodeg*degtorad;      (RAD)
HAdeg=HA*radtodeg;
HA=HrAng(i)*hrtorad;
CE=[cos(Dec)*sin(HA);cos(Dec)*cos(HA);sin(Dec)];
CECH=[-1 0 0;0 -sin(Lat) cos(Lat);0 cos(Lat) sin(Lat)];
ALTAZ=CECH*CE;
altd=asin(ALTAZ(3,1))*radtodeg;
azd=atan2(ALTAZ(1,1),ALTAZ(2,1))*radtodeg;
AZDEG(i)=azd;
ALTDEG(i)=altd;
altr=asin(ALTAZ(3,1));
azr=atan2(ALTAZ(1,1),ALTAZ(2,1));
CHGEOC=[0 1 0;1 0 0;0 0 -1];
dLat=0;    Note: =0 effectively cancels BPdircos code calculations
GEOCNAV=[cos(dLat) 0 -sin(dLat);0 1 0;sin(dLat) 0 cos(dLat)];
[X,Y,Z]=sph2cart(azr,altr,1.0);
NAV1=GEOCNAV*CHGEOC*CECH*CE;
aznav=azr+pi/2;
aznavdeg=aznav*radtodeg;
Rot=[cos(aznav) sin(aznav) 0;-sin(aznav) cos(aznav) 0;0 0 1];
NAV=ROt*NAV1;
ythetaNAV=(atan2(NAV(1,1),NAV(3,1)));
ythetaNAV=(ythetaNAV-pi)*radtodeg;
xphiNAV=(atan2(NAV(3,1),NAV(2,1)));
xphiNAV=(xphiNAV+pi/2)*radtodeg;
zpsiNAV=(atan2(NAV1(2,1),NAV1(1,1)));
if (zpsiNAV>= 0 & zpsiNAV<=(pi/2)),ypsiNAV=zpsiNAV + (pi/2);,
end
if (zpsiNAV> (pi/2) & zpsiNAV<=(pi)),ypsiNAV=zpsiNAV - (3*pi/2);,
end
if zpsiNAV< 0 & zpsiNAV>=(-pi/2),ypsiNAV =zpsiNAV +pi/2;,end
if zpsiNAV<= (-pi/2) & zpsiNAV>=(-pi),ypsiNAV=zpsiNAV + (pi/2);,
end
zpsiNAV=ypsiNAV*radtodeg;
R=abs(NAV(1,1)+NAV(2,1)*sqrt(-1));
NAV(1,1)=R*sin((zpsiNAV-psideg)*degtorad);
ythetaNAV=(atan2(NAV(1,1),NAV(3,1)))*radtodeg;
if ythetaNAV>5,ythetaNAV=ythetaNAV-180;,end
if ythetaNAV<-5,ythetaNAV=ythetaNAV+180;,end
STARNAV_angles=[xphiNAV;ythetaNAV;zpsiNAV];
EULER_Angles=[phideg thetadeg psideg]';
INScommNAV=abs(STARNAV_angles) - abs(EULER_Angles);
ComdelPhi(i)=INScommNAV(1,1);
ComdelTheta(i)=INScommNAV(2,1);
ComdelPsi(i)=INScommNAV(3,1);
ComPhi(i)=STARNAV_angles(1,1);
ComTheta(i)=STARNAV_angles(2,1);
ComPsi(i)=STARNAV_angles(3,1);
The following lines are used as an intermediary check to plot
results obtained thus far and are deactivated here using .
plot(kn,PHI,kn,ComPhi')
grid,title('MEASURED AND COMPUTED ELEVATION ANGLES')
xlabel('DATA TIME ICREMENTS (TIME=0.125 SEC/COUNT)')
ylabel('ANGLE (DEGREES)')
pause
plot(kn,THETA,kn,ComTheta')
grid,title('MEASURED AND COMPUTED LINE OF SIGHT ANGLES')
xlabe('DATA TIME ICREMENTS (TIME=0.125 SEC/COUNT)')
ylabel('ANGLE (DEGREES)')
pause
plot(kn,PSI,kn,ComPsi')
grid,title('MEASURED AND COMPUTED AZIMUTH ANGLES')
xlabel('DATA TIME INCREMENTS (TIME=0.125 SEC/COUNT)')
ylabel('ANGLE (DEGREES)')
pause
clear PHI
clear THETA
```

-continued

POINTING SYSTEM EXPERIMENTAL CODE

```
clear PSI
clear ComPhi
clear ComTheta
clear ComPsi
clear kn
COMPUTE RECURSIVE RMS VALUES OF SELECTED
NAVIGATION VARIABLES (MEAS)=INScommandNAV
NOTE: CAVEAT!!! THIS COVARIANCE EQUATION IS NOT
ACCURATE
FOR A PURE CONSTANT
end
MnPhi(j)=mean(ComdelPhi);
RMSPhi(j)=std(ComdelPhi);
CovPhi(j)=cov(ComdelPhi);
MnTheta(j)=mean(ComdelTheta);
RMSTheta(j)=std(ComdelTheta);
CovTheta(j)=cov(ComdelTheta);
MnPsi(j)=mean(ComdelPsi);
RMSPsi(j)=std(ComdelPsi);
CovPsi(j)=cov(ComdelPsi);
clear ComdelPhi
clear ComdelTheta
clear ComdelPsi
end
MnRms=[MnPhi' MnTheta' MnPsi' RMSPhi' RMSTheta' RMSPsi']
MnPhi=sum(MnRms(:,1))/16
MnTheta=sum(MnRms(:,2))/16
MnPsi=sum(MnRms(:,3))/16
AngCOV=[CovPhi' CovTheta' CovPsi'];
MnsigPhi=sum(AngCOV(:,1))/16;
MnsigTheta=sum(AngCOV(:,2))/16;
MnSigPsi=sum(AngCOV(:,3))/16;
Sigphi=sqrt(MnSigPhi)
SigTheta=sqrt(MnSigTheta)
SigPsi=sqrt(MnSigPsi)
  END OF CODE
```

What is claimed is:

1. An inertial pointing system for pointing to a designated target with known coordinates, from a stationary or moving platform, in order to provide accurate position, steering, or command information, the system comprising in combination:

a pointing instrument secured to the platform, and having a field of view and a variable attitude;

an inertial navigation system (INS) decoupled from the platform, and mounted directly onto said pointing instrument, for moving in inertial space independently from the platform, such that the platform becomes slaved to said pointing instrument and said INS; and a processor for storing a series of predetermined transformation routines, and for interfacing with said INS and converting the attitude of said pointing instrument and said series of transformation routines into command angles, in order to point said pointing instrument accurately at the designated target, so that the target is captured automatically within said field-of-view of said pointing instrument.

2. The inertial pointing system of claim 1, further including a GPS antenna that feeds GPS signals to said INS, for correcting dead reckoning navigation.

3. The inertial pointing system of claim 2, wherein said processor further converts said GPS signals and selected INS measurements into command angles.

4. The inertial pointing system of claim 3, wherein said pointing instrument is any one of a telescope, an antenna, a sensor, a laser, a cannon, and a missile launcher.

5. The inertial pointing system of claim 3, wherein the target is any one of a star, a satellite, a landmark, and a moving object.

6. The inertial pointing system of claim 3, wherein the platform is moving and is any one of an aircraft, a ship, and a ground vessel.

7. The inertial pointing system of claim 3, wherein the platform is fixed.

8. The inertial pointing system of claim 3, wherein said processor transforms selected input data to a selected celestial spherical coordinate frame (Celestial Equator C.E.), and then transforms said C.E. coordinate frame to corresponding Celestial Horizon (C.H.) azimuth and altitude spherical angles.

9. The inertial pointing system of claim 2 further including a position encoder for providing position coordinates of the platform relative to said INS and said instrument.

10. The inertial pointing system of claim 1, wherein said processor further transforms selected input data to a geocentric rectangular coordinate frame.

11. The inertial point system of claim 1, wherein said processor further generates platform steering commands and corrected pointing instructions to said pointing instrument.

12. A method for pointing to a designated target with known coordinates, from a platform, in order to provide accurate position, steering, or command information, the method comprising the steps of:

securing a pointing instrument to the platform, the pointing instrument having a field of view and a variable attitude;

decoupling an inertial navigation system (INS) from the platform, and mounting it directly onto said pointing instrument, for moving in inertial space independently from the platform, such that the platform becomes slaved to said pointing instrument and said INS; and using a processor for storing a series of predetermined transformation routines, and for interfacing with said INS and converting the attitude of said pointing instrument and said series of transformation routines into command angles, in order to point said pointing instrument accurately at the designated target, so that the target is captured automatically within said field of view of said pointing instrument.

13. The method according to claim 12, further including the steps of: inputting the known coordinates of the target in said processor; and feeding GPS signals to said INS for correcting dead reckoning navigation errors, in order to provide accurate positioning and time readings.

14. The method according to claim 13, further including the steps of:

said processor transforms selected input data to a selected celestial spherical coordinate frame (Celestial Equator C.E.), and then transforms said C.E. coordinate frame to corresponding Celestial Horizon (C.H.) azimuth and altitude spherical angles;

said processor transforms selected input data to a geocentric rectangular coordinate frame; and said processor generates pointing commands and corrected pointing instructions to said pointing instrument.

15. The method according to claim 14, wherein said step of transforming to a selected celestial spherical frame includes the steps of:

computing Greenwich Mean Sidereal Time (GMST);

generating Local Mean Sidereal Time (LMST);

computing Hour Angle (HA); and transforming said C.E. coordinate frame to said C.H. coordinate frame.

16. The method according to claim 15, wherein said step of transforming selected input data to a geocentric rectangular coordinate frame includes the steps of:

transforming said C.H. coordinate frame to a geocentric coordinate frame;

transforming said geocentric coordinate frame to a geodetic coordinate frame; and transforming said geodetic coordinate frame to a navigation coordinate frame.

17. The method according to claim 16, wherein said step of inputting the known coordinates of the target in said processor includes the step of inputting right ascension (RA) and declination (DEC) coordinates.

18. The method according to claim 17, where said step of generating pointing commands and corrected pointing instructions to said pointing instrument includes the step of generating instrument angles, and applying a control logic for aligning said pointing instrument in a terrestrial (INS inertial) navigation tangent plane.

19. The method according to claim 18, wherein said step of computing instrument angles includes the step of computing pointing angles (Theta, Psi, Phi) for said instrument in said navigation coordinate frame.

20. The method according to claim 19, wherein said step of applying a control logic includes the steps of computing incremental pointing command angles by comparing INS-generated Euler angles with said computed instrument angles for generating corrected pointing angle commands (PHIcomm, PSIcomm, PHIcomm).

21. A method for determining the coordinates of a target from a platform, comprising the steps of:

securing a pointing instrument to the platform, said pointing instrument having a field of view and a variable attitude;

decoupling an inertial navigation system (INS) from the platform, and mounting it directly onto said pointing instrument, for moving in inertial space independently from the platform, such that the platform becomes slaved to said pointing instrument and said INS;

pointing said pointing instrument to the target; and using a processor for storing a series of predetermined transformation routines, and for interfacing with said INS and for converting the attitude of said pointing instrument and said series of transformation routines into the coordinates of the target.

22. The method according to claim 21, wherein said step of converting includes the steps of:

using rates ($\omega_X$, $\omega_Y$, $\omega_Z$) corresponding to INS generated Euler angles (Phi, Theta, Psi) and forming a pointing coordinate frame therefrom;

integrating said pointing coordinate frame in a navigation frame to generate a Navigation coordinate frame (Xnav, Ynav, Znav);

transforming the Navigation coordinate frame (Xnav, Ynav, Znav) into a Geodetic coordinate frame vector (Xgeod, Ygeod, Zgeod);

transforming the Terrestrial Geodetic coordinate frame vector (Xgeod, Ygeod, Zgeod) into a Terrestrial Geocentric coordinate frame vector (Xgeoc, Ygeoc, Zgeoc);

transforming the Terrestrial Geocentric coordinate frame vector (Xgeoc, Ygeoc, Zgeoc) into a C.H. coordinate frame vector (Xch, Ych, Zch); and transforming the C.H. coordinate frame vector (Xch, Ych, Zch) into a C.E. coordinate frame rectangular vector, wherefrom the target coordinates are derived.

\* \* \* \* \*